Patented Sept. 4, 1934

1,972,310

UNITED STATES PATENT OFFICE 1,972,310

PROCESS FOR PRODUCING PURE WHITES AND A PURE YELLOW IN SCREENED PHOTOGRAPHIC PICTURES

Franz Hubert Müller, Dusseldorf, Germany, assignor to Durkoppwerke Aktiengesellschaft, Bielefeld, Germany No Drawing. Application January 5, 1933, Serial No. 650,363. In Germany December 10, 1931

4 Claims. (Cl. 95—2)

The production of coloured photographic prints according to the additive screen process is open to the objection that the pictures have no pure whites but a film which merges into a cloudy dark brownish grey. This film is due to the fact that every green dye contains about 60% of black. In order to obtain a correct color separation, it is necessary to add black dye to the other two dyes, that is red and blue, or to choose such dyes which already contain a high percentage of dark dyes. The result is that the additive mixing of the three base colors does not produce absolutely pure white, but the above mentioned dark brownish grey. The invention has for its object to overcome this objection and consists in that for coloring the different colored screen lines dyes are employed which after the photographic copying and development can be again corroded out or bleached by a separate subsequent treatment.

It is already known to employ multi-colored screens partly with dyes capable of being brightened; however, the object of these known screens is merely to do away with the usual yellow filter during the taking of the coloured photographs.

According to the invention dyes are chosen for forming the colored screen lines and to obtain pure whites, which dyes can easily be bleached out in a suitable bath, both the red and the green dyes bleaching out to yellow, whereas the blue dye merely becomes lighter without its color being changed by the above mentioned bleaching bath.

Pyrazol yellow and acid green have been found to be suitable dyes. These are mixed to form green, whereas for red pyrazol yellow and acid rhodamine are mixed. Patent blue and acid violet are mixed to form blue. A screen provided with these dyes is applied to a panchromatic photographic paper. This paper is copied from a colored negative. After the copying the paper is placed in a developer having the property of hardening the gelatine more or less at the more or less blackened portions. The paper is then placed in a bleaching bath which slightly bleaches out the blackened silver but strongly hardens the gelatine at the black portions. The print is then placed in a mordant bath consisting of a mixture of potassium metabisulphite, spirit, ammonia and sodium thiosulphate. In this bath firstly the unexposed silver is washed out and secondly the dye is strongly attacked at the light unexposed portions of the picture, that is where the gelatine is not hardened.

As already mentioned, yellow is produced by the additive mixture of red and green. As these two dyes in the example in question are, however, not covered with the silver grain and are consequently not hardened, they are bleached out, thereby becoming yellow. This is due to the mixing of the two dyes, that is to the admixture of pyrazol yellow. This yellow resists the mordant bath, whereas the carrier dyes, in this instance acid green and acid rhodamine, are strongly attacked and almost completely removed by the mordant bath. The gelatine in the blue lines which is blackened by yellow during the copying, is not hardened with absolutely sharp edges, but the hardening extends like a halo over the surrounding gelatine. Consequently, in the case of yellow only the core of the two lines is actually bleached out, whereas the outer edges of the dye remain. Where a pure red is to appear, the green and blue are covered with silver grain and only the red lines of the screen can shine through and thus leave a red impression, the hardening of the gelatine layer over green and blue is not sharply bordered, but extends like a halo also over the red, the mordant bath cannot attack the red at all or only weakly. In the case of yellow where two lines lie side by side, the hardening does not entirely overlap and the bleaching consequently also takes place only slightly, but nevertheless sufficiently to obtain a pure yellow impression. In the case of white everything is bleached out. The red and green dyes bleach to yellow and the blue dye bleaches to light blue and the additive mixing of light yellow and light blue produces an absolutely tolerable white.

All the dyes above mentioned are manufactured by the I. G. Farbenindustrie A.-G. and referred to in the "Pina Handbouch" published by that company.

I claim:—

1. A process for making an opaque multi-colour screen picture from a coloured screen negative, consisting in applying to a sensitized photographic paper a multi-colored screen composed of different colored dyes certain of which are capable of being bleached out, in exposing the paper through a multi-color screen negative, in developing in a developer which develops the silver image and hardens the gelatine at the blackened portions, in placing in a tanning bath to slightly dissolve the black silver and strongly harden the gelatine at the black portions, in placing the print in a fixing and bleaching bath to wash out the unexposed silver and attack the dyes at the unexposed portions, the dyes at the exposed portions being protected by the hardened gelatine.

2. A process as specified in claim 1, consisting in turning the red and green lines of the screen yellow and its blue lines to a lighter shade in the bleaching bath.

3. A process for making an opaque multi-color screen picture from a colored screen negative, consisting in applying to a sensitized photographic paper a screen formed of a green dye composed of a mixture of pyrazol yellow and acid green, a red dye composed of a mixture of pyrazol yellow and acid rhodamine, and a blue dye composed of a mixture of patent blue and acid violet, in exposing the paper through the multi-colored screen negative, in developing in a developer which develops the silver image and hardens the gelatine at the exposed portions, in placing the print in a bath to slightly dissolve the black silver and strongly harden the gelatine at the black portions, and in placing the print in a fixing and bleaching bath to wash out the unexposed silver and turn to yellow the red and green dyes and brighten the blue dye of the screen at the unexposed portions, the dyes at the exposed portions being protected by the hardened gelatine.

4. A process for making an opaque multi-color screen picture from a colored screen negative, consisting in applying to a sensitized photographic paper a screen formed of a green dye composed of a mixture of pyrazol yellow and acid green, a red dye composed of a mixture of pyrazol yellow and acid rhodamine, and a blue dye composed of a mixture of patent blue and acid violet, in exposing the paper through the multi-colored screen negative, in developing in a developer which develops the silver image and hardens the gelatine at the exposed portions, in placing the print in a bath to slightly dissolve the black silver and strongly harden the gelatine at the black portions, and in placing the print in a fixing and bleaching bath composed of potassium metabisulphite, spirit ammonia and sodium thiosulphate to wash out the unexposed silver and turn to yellow the red and green dyes and brighten the blue dye of the screen at the unexposed portions the dyes at the exposed portions being protected by the hardened gelatine.

FRANZ HUBERT MÜLLER.